United States Patent [19]
Farthing et al.

[11] Patent Number: 5,037,588
[45] Date of Patent: Aug. 6, 1991

[54] MANUFACTURE OF SILICON CARBIDE ARTICLES

[75] Inventors: Leslie J. Farthing, Rugby; John D. Holme, Harborough Magna; Robert A. Wordsworth, Dunchurch, all of United Kingdom

[73] Assignee: T & N Technology Limited, Warwickshire, England

[21] Appl. No.: 514,208

[22] Filed: Apr. 25, 1990

[51] Int. Cl.$^5$ .................. C01B 31/36; B29C 45/00
[52] U.S. Cl. ........................ 264/29.1; 264/328.2
[58] Field of Search ............. 264/29.1, 328.2, 328.1, 264/328.9

[56] References Cited

U.S. PATENT DOCUMENTS

| | | | |
|---|---|---|---|
| 4,044,110 | 8/1977 | Noakes et al. | 264/328.1 |
| 4,446,085 | 5/1984 | Earsley | 264/328.1 |

FOREIGN PATENT DOCUMENTS 1370478  10/1974  United Kingdom ............. 264/328.1

OTHER PUBLICATIONS

Willermet et al., "Development and Processing of Injection-Moldable Reaction-Sintered SiC Compositions", *Ceramic Bulletin* (1978).

Primary Examiner—James Lowe
Assistant Examiner—Christopher A. Fiorilla
Attorney, Agent, or Firm—Nixon & Vanderhye

[57] ABSTRACT

A method of making a siliconized silicon carbide article by
 (i) injection-molding a mixture which comprises a major proportion of silicon carbide particles and a minor proportion of organic binder material, the mixture being flowable under heat and pressure,
 (ii) heating the molded article thus formed so as to remove the organic binder material from it and obtain a porous silicon carbide body containing elemental carbon, and
 (iii) impregnating the porous body with molten silicon to convert said carbon to silicon carbide which binds together the original silicon carbide particles,
in which step (iii) is carried out by utilizing as a conduit for said molten silicon the sprue that is formed integrally with the injection-molded article in step (i).

The method avoids excessive contact between the surface of the porous intermediate shaped body and molten silicon employed for siliconization, and so reduces the possibility of damage to that body while it is in the weakly bonded state.

11 Claims, 3 Drawing Sheets

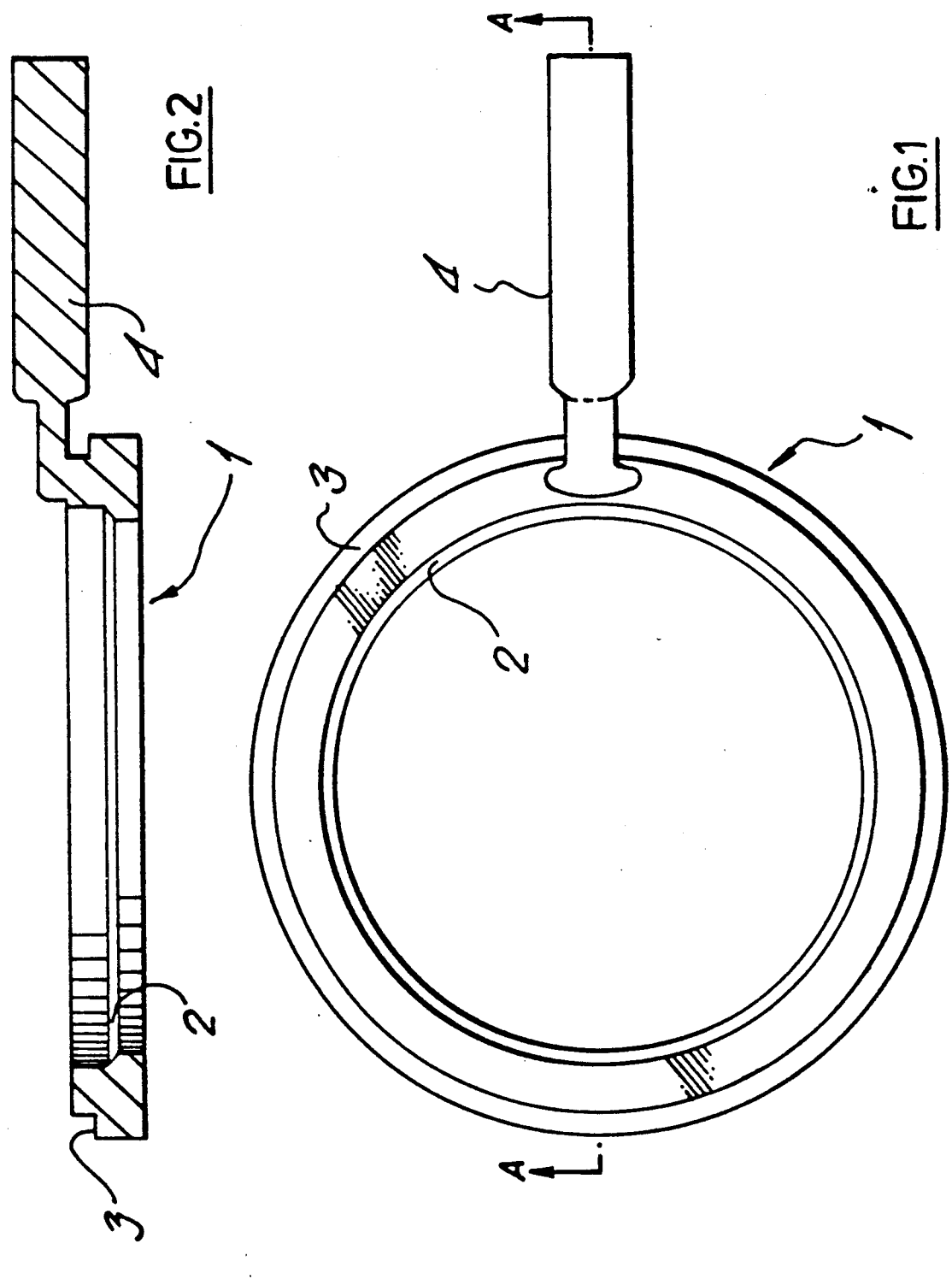

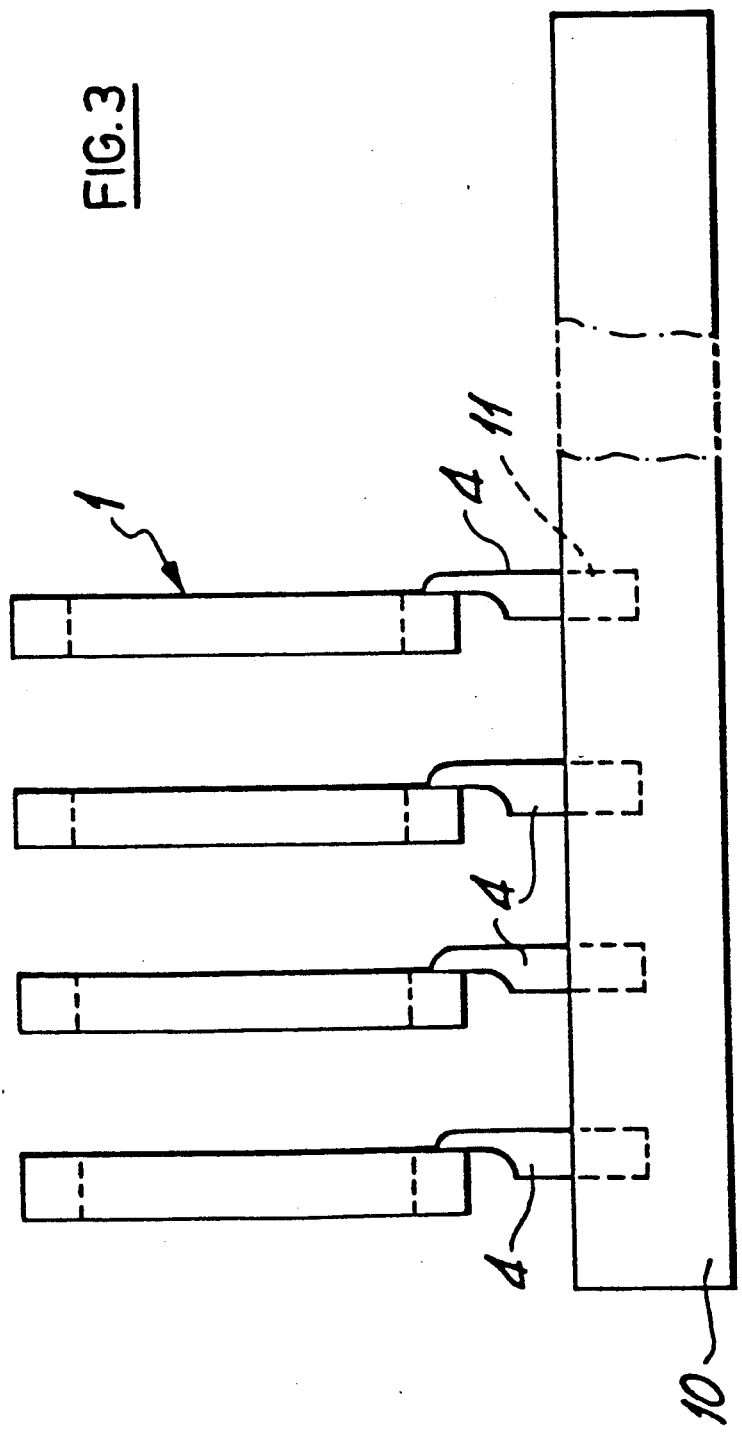

MANUFACTURE OF SILICON CARBIDE ARTICLES

This invention relates to the manufacture of silicon carbide articles, and in particular to manufacture by injection molding followed by siliconization.

Articles resistant to thermal shock and with good mechanical properties can be made from particles of the highly refractory substance silicon carbide by a variety of methods. In the injection-molding/siliconization method, a mixture flowable under heat and pressure which comprises a major proportion of silicon carbide particles and a minor proportion of organic binder material is injected through a narrow orifice to fill a shaped cavity in a mold at lower temperature. The article thus formed is then removed from the mold, and the sprue (i.e. the waste piece corresponding to the passage in the mold tool between the molding orifice and the mold cavity) is machined off.

The molded article is then heated to remove the organic binder material from it and leave a porous silicon carbide body containing elemental carbon which (at this stage) weakly binds together the highly refractory silicon carbide particles. The elemental carbon may be present as a result of generation by pyrolysis of the original organic binder material in the mixture submitted to molding (as in GB-1,454,622) or as a result of its inclusion per se in that mixture.

The porous body thus produced is then impregnated with molten silicon to convert the carbon present to silicon carbide. In more detail, the carbon present dissolves in and reacts with the molten silicon which is drawn up into the pores of the body, and the silicon carbide thus formed bonds together the original silicon carbide particles into a unitary structure of great strength. This step is conventionally carried out in a furnace at high temperature, e.g. 1500°-1600° C., and low pressure, e.g. 0.5 mm Hg, as mentioned in the UK Patent No 1,454,622.

The present invention is concerned with improving the method just described so as to avoid excessive contact between the surface of the weakly bonded porous shaped body obtained as intermediate product and the molten silicon employed for siliconization, and thus reduce the possibility of damage to that body.

According to the invention there is provided a method for making a siliconized silicon carbide article by (i) injection-molding a mixture which comprises a major proportion of silicon carbide particles and a minor proportion of organic binder material, the mixture being flowable under heat and pressure, (ii) heating the molded article thus formed so as to remove the organic binder material from it and obtain a porous silicon carbide body containing elemental carbon, and (iii) impregnating the porous body with molten silicon to convert said carbon to silicon carbide which binds together the original silicon carbide particles, in which step (iii) is carried out by utilizing as a conduit for said molten silicon the sprue that is formed integrally with the injection-molded article in step (i).

Preferably elemental carbon, for example in the form of finely divided graphite or carbon black, is included in the mixture in step (i) above.

Step (iii) is carried out under the usual conditions, e.g. in a furnace under very low pressure. Preferably in step (iii) the sprue is used as a wick to pick up molten silicon from a block (i.e. carrier) made from porous carbon. The sprue may be inserted in a suitable sized hole in the block of porous carbon, which is supplied with molten silicon, for example either by locating the block in direct contact with molten silicon in a reservoir, or by using the block itself as a reservoir.

The porous carbon block may conveniently be a block of porous carbon insulation material, which we have found to function effectively as a medium for mounting components by means of their sprues during siliconization and for transferring molten silicon into the sprues, which rest in holes in the block and are arranged to be a snug fit to facilitate transfer of silicon from block to sprue.

The siliconized sprue that results from operation of the method is of course very strong, and can if desired be left as it is. It may, however, be cut down flush with the surface of the article, or only partly, so as to leave a stub, of maximum length no more than a few mm, say up to 5-10 mm, to serve as a location or alignment means, as explained later in this specification.

The invention has particular application to the manufacture of sealing rings, but may be used for the manufacture of other, more complex, components, for example turbocharger rotors.

The invention will now be further described with reference to the accompanying drawings, in which:

FIG. 1 is a plan of an injection-molded silicon carbide article, with the sprue still present, shaped as a sealing ring;

FIG. 2 is a section on line AA in FIG. 1;

FIG. 3 is a diagram showing an assembly of four of the articles of FIG. 1 which have been made porous and are mounted vertically for siliconization.

Figure 4:
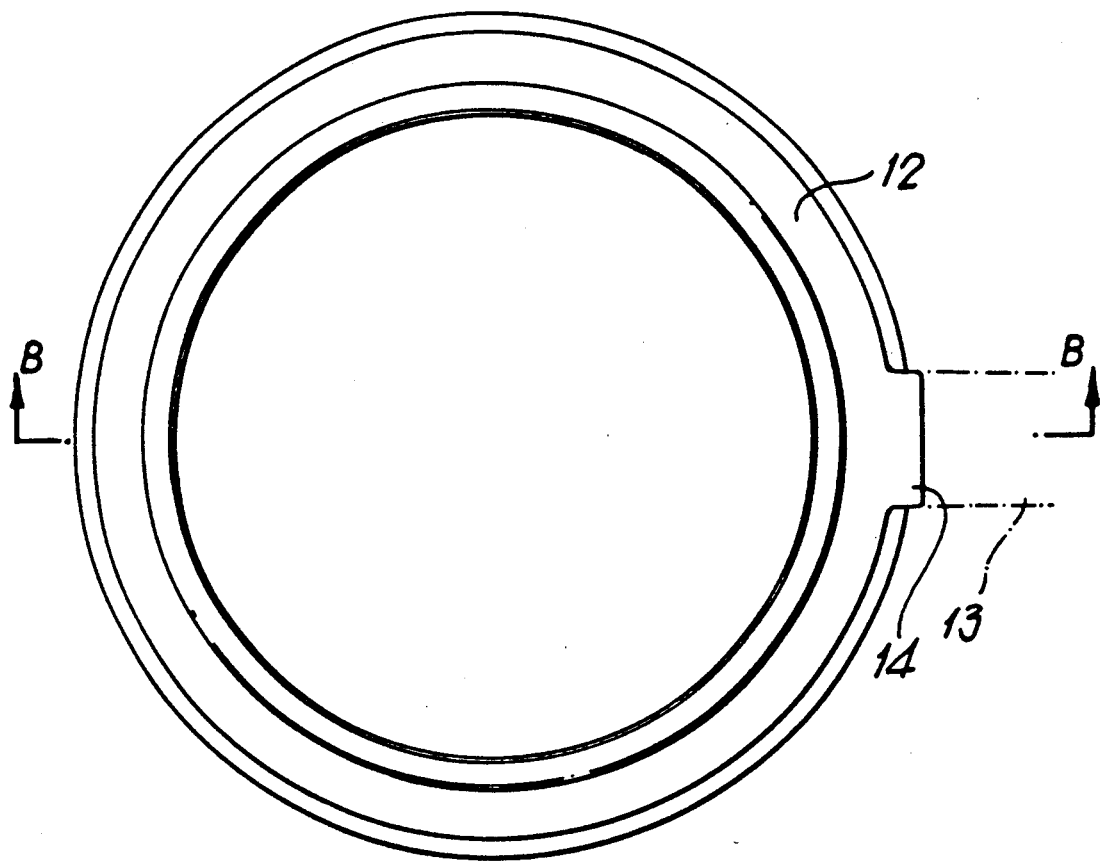
FIG. 4 is a plan view of a sealing ring with an anti-rotation lug.

In FIGS. 1 and 2 the ring-shaped injection-molded silicon carbide article 1 has an interior shoulder 2 and an exterior shoulder 3, and has the sprue 4 formed during injection molding still integral with it. The article 1 can be made as follows.

A mixture of conventional composition (suitably 61% by weight silicon carbide, particle size below 20 μm; 18% by weight graphite, particle agglomerate size below 20 μm; remainder a thermoplastic binder material) is prepared and granulated, and the granules are injection-molded in a standard injection molding machine, to form rings of height 6.5 mm, external diameter 72.4 mm and internal diameter 61 mm, with a sprue length of about 40 mm.

The ring is removed from the mold and, to avoid distortion, is supported while it cools to room temperature. The article is then heated, while still under support, in an air oven. Once the temperature has reached a value at which the binder is soft, the rate of increase is limited to 2° C. per hour until a temperature of about 300° C. is attained. This heating first oxidizes, and then pyrolyzes, the thermoplastic binder while leaving the original elemental carbon in the resulting porous structure as a weak binder for the original silicon carbide particles. The density of the porous body formed is about 2.2 g/cm$^3$.

After the porous ring has cooled, half the length of the sprue is sawn off so as to shorten the travel path of molten silicon subsequently, and the ring is supported vertically with several others by insertion (see FIG. 3) of the sprue 4 in recess 11 in a block (i.e. carrier) 10 of porous carbon situated on the surface of a reservoir (not shown) of silicon flakes in a conventional furnace. Operation of the furnace at high temperature and very low pressure in an entirely conventional manner leads to melting of the silicon flakes and transport of liquid silicon from the reservoir into the porous block 10, and through the conduit formed by porous sprue 4 of the porous ring into the ring itself. There it reacts with the elemental carbon present to form silicon carbide, which 'reaction bonds' the particles of silicon carbide originally included in the mix subjected to injection molding. The density of the finished product is about 3.1 g/cm$^3$.

The sprue can be severed by grinding. If this is done so as to leave a stub, say about 3 mm high, protruding above the surface of ring 1 (the upper surface in FIG. 2), the stub can serve as a location or alignment means for the ring in a metal or other housing of which it is to form a sealing component.

Figure 5:
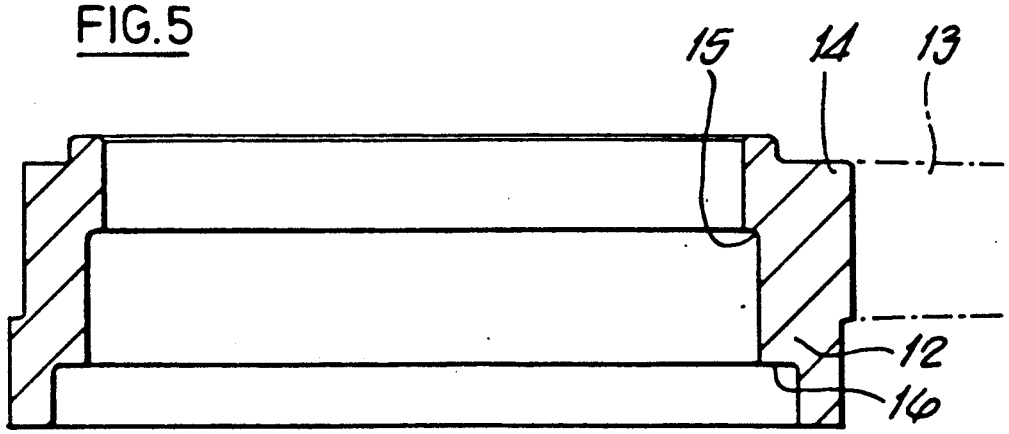
FIG. 5 is a section on line BB in FIG. 4.

A further alignment means derived from a sprue is illustrated in FIGS. 4 and 5, FIG. 5 being a cross-sectional view of the sealing ring of FIG. 4.

The sealing ring 12 shown in FIGS. 4 and 5 has two internal shoulders 15, 16 and the two external shoulders 17, 18 and has been produced as described above with a molding sprue 13 (shown in dotted lines) having been used for siliconization. However, the molding sprue in this embodiment has been ground down to form an anti-rotation lug 14 on the sealing ring, extending between the two external shoulders 17 and 18.

We claim:

1. A method of making a siliconized silicon carbide article comprising the steps of:
   (i) injection-molding a mixture which comprises a major proportion of silicon carbide particles, a minor proportion of organic binder material and a source of elemental carbon, the mixture being flowable under heat and pressure,
   (ii) heating the molded article thus formed under such conditions as to oxidize and pyrolize the organic binder material, thereby removing said binder and obtaining a porous silicon carbide body containing elemental carbon, and
   (iii) impregnating the porous body with molten silicon to convert said carbon to silicon carbide which binds together the original silicon carbide particles, in which step (iii) is carried out by utilizing as a conduit for said molten silicon the sprue that is formed integrally with the injection-molded article in step (i).

2. The method according to claim 1, in which in step (iii) the sprue is inserted in a porous carbon carrier, a source of silicon is placed in contact with the carrier and the sprue is used as a wick to pick up molten silicon from the porous carbon carrier.

3. The method according to claim 2, in which the sprue is inserted in a suitably sized hole in the porous carbon carrier, which is supplied with molten silicon.

4. The method according to claim 1, in which the siliconized sprue that results is cut down so as to leave a stub, a maximum length no more than a few mm, protruding from the article.

5. The method according to claim 1, in which the silicon carbide article is a sealing ring.

6. A method of making a siliconized silicon carbide article comprising the steps of:
   (i) injection-molding a mixture which comprises a major proportion of silicon carbide particles, a minor proportion of organic binder material and optionally a source of elemental carbon, the mixture being flowable under heat and pressure,
   (ii) heating the molded article thus formed under such conditions as to convert the organic binder material to elemental carbon and obtain a porous silicon carbide body containing elemental carbon, and
   (iii) impregnating the porous body with molten silicon to convert said carbon to silicon carbide which binds together the original silicon carbide particles, in which step (iii) is carried out by utilizing as a conduit for said molten silicon the sprue that is formed integrally with the injection-molded article in step (i).

7. The method according to claim 6, in which the mixture used in step (i) contains elemental carbon.

8. The method according to claim 6, in which in step (iii) the sprue is inserted in a porous carbon carrier, a source of silicon is placed in contact with the carrier and the sprue is used as a wick to pick up molten silicon from the porous carbon carrier.

9. The method according to claim 8, in which the sprue is inserted in a suitably sized hole in the porous carbon carrier, which is supplied with molten silicon.

10. The method according to claim 6, in which the siliconized sprue that results is cut down so as to leave a stub, a maximum length no more than a few mm, protruding from the article.

11. The method according to claim 6, in which the silicon carbide article is a sealing ring.

* * * * *